Feb. 25, 1930.  W. NOBLE  1,748,362

JOURNAL BEARING

Filed Nov. 10, 1927

Inventor
Warren Noble.

By

Attorney

Patented Feb. 25, 1930

1,748,362

UNITED STATES PATENT OFFICE

WARREN NOBLE, OF DETROIT, MICHIGAN

JOURNAL BEARING

Application filed November 10, 1927. Serial No. 232,256.

This invention relates more particularly to the journalling of crankshafts in engine structures, but is capable of application to the journalling of other shafts or rotary bodies, and has among its objects to provide for ready bearing renewal and inspection as well as easy shaft assembly whereby the conditions of both building and servicing a structure embodying the said invention is greatly simplified both as to labor and skill required.

The invention also has as an object to effect the elimination of many machining operations of a difficult nature, such as are encountered in providing for the mounting of a crankshaft in the plain bearings ordinarily employed in engine construction, and to render possible accurate crankshaft mounting and aligning by comparatively simple machine operations and the use of simply applied devices.

A further object is to obtain, by the use of the improved journals and their means of application, a very rigid crankcase structure and incidentally a very rigid crankshaft support in an engine or similar structure.

The invention also contemplates the obtaining of a high degree of interchangeability of journal parts with a low degree of disassembly at any stage of interchanging, and with an assurance of correct maintenance of shaft alignment and bearing contact after interchanging of parts whereby efficient servicing of the bearings and shafts is facilitated.

A further and important object is to provide a segmental bearing wherein the segments are separately adjustable in a universal manner to obtain correct contact relation to the shaft, and wherein upon application to the shaft, the segments will tend to automatically adjust themselves to such contact relation.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide the crankcase of an engine about the crankshaft with tubular bosses arranged on axes transverse to the axis of the shaft, these bosses enclosing cylindrical bearing supports or retainers having at their inner ends segmental bearing blocks pivoted or hinged on the said supports whereby said blocks, due to their pivoted mounting and the rotatable mounting of their supports in said bosses, are capable of universal movement.

The said supports are adapted to be inserted into the said bosses from the outer side of the crankcase and the outer ends of the bores of the said bosses opening to outer machined faces of the crankcase, which faces receive closures which, when in position, prevent retraction of said supports from the bosses and maintain the bearing blocks in contact with the shaft; the closures being clamped in position over the outer ends of the bosses by a suitable means.

All of which is more particularly described and ascertained hereinafter, by way of example, having reference to the accompanying drawing, wherein:—

Similar characters of reference indicate similar parts in the several figures of the drawing.

Figure 1:
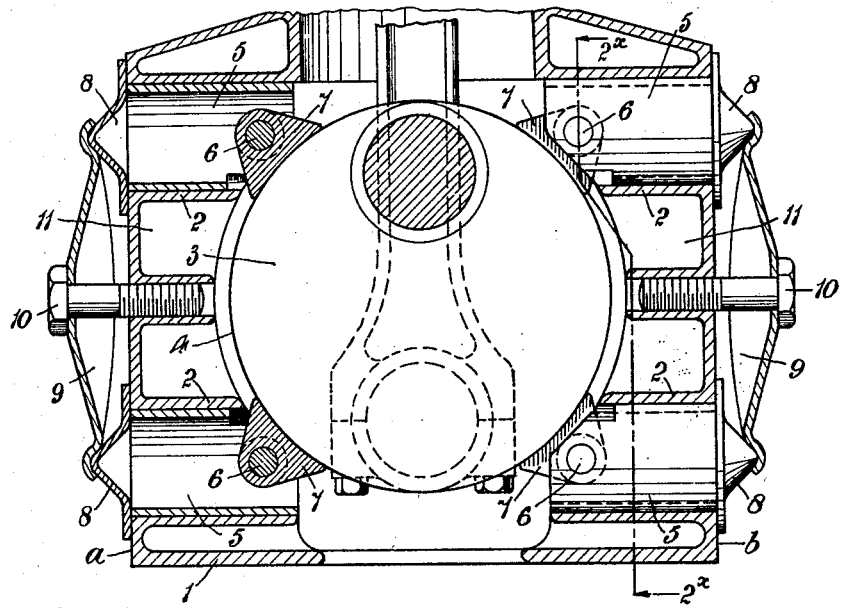
Figure 1 is a fragmentary transverse section of a crankcase, the section being taken on a plane indicated by the line $1^x$—$1^x$ of Figure 2, and the right hand bearing members being shown in elevation.
Figure 2:
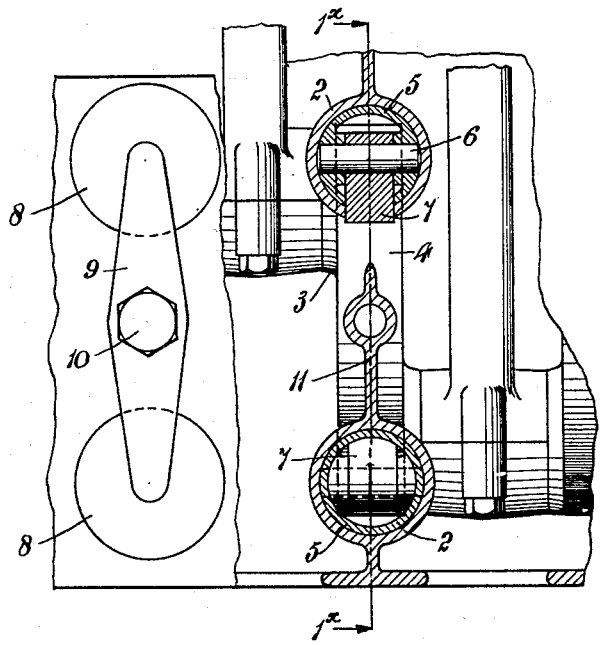
Figure 2 is a fragmentary elevation of the same, partly in section, on a plane indicated by the line $2^x$—$2^x$ of Figure 1.
Figure 3:
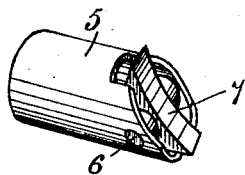
Figure 3 is a perspective view of one of the bearing members or units removed.

The crankcase 1 of the engine is shown as having its opposite sides machined parallel as at $a$ and $b$ and as having provided in its structure tubular bosses 2. The axes of these bosses are in planes at right angles to the axis of the crankshaft 3 which, in this instance, is indicated as having circular crank cheeks 4 forming the bearing portions of the said crankshaft so that the axes of the said bosses are located in planes transverse of the said cheeks. In the example illustrated, the said bosses are shown as being arranged in pairs on opposite sides of each crankshaft cheek, the upper boss of each pair being above the center of the crankshaft and the lower boss below the said center; this being a very desirable arrangement, although it is not essential that they should be so located relative to the crankshaft center as, for instance, they may be radial thereto, if so desired.

In each of the said bosses is slidably mounted a cylindrical bearing support 5, the inner end of which carries a transverse pin 6 on which is swingably mounted a bearing block 7 having an arcuate face complementary to the curvature of the bearing surface of the crank cheek 4, so that, by the rocking of the block 7 on its pin and the rotation of the support 5, a universal movement is provided permitting the self-adjustment of the block when applied to the bearing surface as will be readily understood; and this applies, of course, to all of the bearing members which include such rocking block and rotatable support.

The said bearing members may be identical and interchangeable, and, with the length of the cylindrical supports relative to the outer faces $a$ and $b$ of the crankcase and the diameter of the crank cheeks 4 determined, it will be obvious that by maintaining the outer ends of the cylindrical supports flush with the said faces $a$ and $b$, true segmental bearings are provided for the said crankshaft, the positioning of which bearings is simply determined by providing means for holding the outer ends of the said supports in their proper relation to the machined faces $a$ and $b$. For this purpose, I have shown caps or abutments 8 extending over the outer ends of the supports 5 and engaging the machined faces $a$ and $b$ of the crankcase, these abutments being held in position by crabs 9 secured to the crankcase by bolts 10.

11 are webs extending between upper and lower bosses 2 of the crankcase so that, with the tubular structure resulting from the presence of bosses in the crankcase, a very rigid crankcase structure is obtained and this imparts a very rigid support to the crankshaft through the bearing members.

It will be noted that in the arrangement shown the alignment of the crankshaft in the crankcase is determined by the alignment of the parallel faces $a$ and $b$, which faces may be machined simultaneously and with great accuracy without difficulty. It will also be obvious that no line reaming operations of the bearings are called for such as is ordinarily required in connection with the plain bearings hitherto generally used for crankshaft journals.

The assembly and aligning of a crankshaft in such a crankcase as that described simply involves the inserting of the crankshaft into the crankcase in a more or less haphazard manner; the insertion of the bearing members into their supports; and the tightening up of the cranks on the caps 8, the bearing blocks automatically adjusting themselves angularly to their correct contact relationship to the bearing surfaces of the crank and centering the crank in its correct relationship to the crankcase.

The arrangement lends itself excellently to the utilizing of large bearings such as the crank cheeks of a crankshaft, as the segmental arrangement of the blocks permits a minimum contact area, free access of oil to the bearing surfaces, the entrance of oil under the leading edges of the blocks, and a rigid support of the blocks in the crankcase.

This invention may be developed within the scope of the following claims without departing from the essential features of the said invention, and it is desired that the specification and drawing be read as being merely illustrative and not in a limiting sense, except as necessitated by the prior art.

What I claim is:—

1. In a journal bearing, segemntal bearing blocks arranged in spaced relation about the center of the said bearing, supporting members on which said blocks are rockably mounted, and a supporting structure on which said members are mounted, said supports being freely rotatable on said structure about axes transverse to the axis of said bearing.

2. In a journal bearing, a casing, cylindrical members freely rotatably mounted in said casing on axes transverse to the bearing axis, segmental bearing blocks rockably carried by said members, and means determining the position of said members relative to the bearing center.

3. In a journal bearing, a casing having cylindrical chambers therein, the axes of which are transverse to the bearing axis, cylindrical bearing supports slidably and rotatably mounted in said chambers, bearing blocks rockably carried by the inner ends of said supports, and means engaging the outer ends of said supports to determine the position of said blocks relative to the bearing center.

4. In combination with the crankshaft of an engine, a crankcase having tubular bosses arranged about the journals of the crankshaft, the axes of the said bosses being in planes transverse to the axis of the journals, bearing supports slidably fitted in said bosses, bearing blocks carried by and swingable on the inner ends of said supports, the outer ends of said supports being flush with the said outer ends of said bosses when said blocks are in working contact with the journals of said crankshaft, and removable means engaging the outer ends of said supports to retain said blocks in position against the journals of said crankshaft.

5. In combination with the crankshaft of an engine, a crankcase having tubular bosses arranged about the journals of the crankshaft, the axes of the said bosses being in planes transverse to the axis of the journals, said crankcase having its opposite sides machined to determine the location of the outer ends of said bosses relative to the axis of the crankshaft, bearing supports slidably fitted in said bosses, bearing blocks carried by and swingable on the inner ends of said supports, the outer ends of said supports being flush with the machined sides of said crankcase when said blocks are in working contact with the journals of said crankshaft, and removable means engaging the outer ends of said supports and the machined sides of said crankcase and definitely positioning said supports relative to said crankshaft.

6. In combination with the crankshaft of an engine, a crankcase having tubular bosses arranged about the journals of the crankshaft, the axes of said bosses being in planes transverse to the axis of the journals, bearing supports slidably fitted in said bosses, said supports being arranged in pairs relative to each journal on opposite sides of the crankcase, bearing blocks carried by and swingable on the inner ends of said supports, the outer ends of said supports being flush with the outer ends of said bosses when said blocks are in working contact with the journals of said crankshaft, and removable means common to each pair of supports engaging the outer ends of said supports to retain said blocks in position against the journals of said crankshaft.

7. In combination with the crankshaft of an engine, a crankcase having tubular bosses arranged about the journals of the crankshaft, the axes of the said bosses being in planes transverse to the axis of the journals, cylindrical bearing supports slidably and rotatably fitted in said bosses, bearing blocks carried by and swingable on axes transverse of said supports, the outer ends of said supports being flush with the said outer ends of said bosses when said blocks are in working contact with the journals of said crankshaft, and removable means engaging the outer ends of said supports to retain said blocks in position against the journals of said crankshaft.

8. In combination with the crankshaft of an engine, a crankcase having tubular bosses arranged about the journals of the crankshaft, the axes of the said bosses being in planes transverse to the axis of the journals, said crankcase having its opposite sides machined to determine the location of the outer ends of said bosses relative to the axis of the crankshaft, cylindrical bearing supports slidably and rotatably fitted in said bosses, bearing blocks carried by and swingable on axes transverse of said supports, the outer ends of said supports being flush with machined sides of said crankcase when said blocks are in working contact with the journals of said crankshaft, and removable means engaging the outer ends of said supports and the machined sides of said crankcase and definitely positioning said supports relative to said crankshaft.

9. In combination with the crankshaft of an engine, a crankcase having tubular bosses arranged about the journals of the crankshaft, the axes of said bosses being in planes transverse to the axis of the journals, cylindrical bearing supports slidably and rotatably fitted in said bosses, said supports being arranged in pairs relative to each journal on opposite sides of the crankcase, bearing blocks carried by and swingable on axes transverse of said supports, the outer ends of said supports being flush with the outer ends of said bosses when said blocks are in working contact with the journals of said crankshaft, and removable means common to each pair of supports engaging the outer ends of said supports to retain said blocks in position against the journals of said crankshaft.

10. In a journal bearing, segmental bearing blocks arranged in spaced circular series, freely rotatable supporting members on which said blocks are swingably mounted, and a casing in which said members are slidably mounted, said members being insertable from the outside of said casing to bring said blocks into operative position.

11. In combination, a casing, a bearing comprising segments supported by said casing, a universal mounting for each of said segments insertable thru said casing in unison with its segment, means exteriorly mounted on said casing for maintaining said mounting together with its segment in operative position, said means also providing adjustment means for said segments.

12. In combination, a shaft, a segmental bearing for said shaft and means for simultaneously adjusting a plurality of the segments comprising said bearing to an equal pressure against said shaft.

13. In combination, a casing having a shaft therein, a segmental bearing in said casing supporting said shaft and means operable from the exterior of said casing for affecting adjustment of a plurality of the segments of said bearing simultaneously for equal pressures against said shaft.

14. In combination, a bearing comprising a plurality of segments and a single means for retaining at least two of said segments in operative relation, said means upon actuation affecting adjustment of both of said segments according to pressure thereagainst.

15. In combination, a casing, a bearing comprising a plurality of segments in said casing, means freely extending thru said casing and carrying said segments, a web overlying the ends of a plurality of said means and means for adjusting said web with respect to said casing whereby said segments are adjusted.

16. In combination, a casing, a bearing within said casing comprised of segments, a universal mounting for each of said segments and means for simultaneously adjusting a plurality of said mountings exteriorly of said casing.

17. In combination, a casing, a bearing within said casing comprising segments arranged in pairs, a universal mounting for each of said segments and means for simultaneously and equally adjusting each pair of said mountings exteriorly of said casing.

18. In combination, a casing, a bearing within said casing comprising segments, a universal mounting for each of said segments, and means outwardly of said casing associated with said mounting for maintaining each of said segments in operative position, removal of said means permitting removal of each segment, whereby each of said segments may be replaced from the exterior of said casing.

19. In combination, a casing, a bearing within said casing comprising a plurality of segments, a universal mounting for each of said segments, means exteriorly mounted on said casing operative against each pair of mountings for maintaining each of said segments in operative relation and for affecting simultaneous adjustment thereof, removal of said means permitting individual removal of each of said mountings together with its associated segment.

In testimony whereof I affix my signature.

WARREN NOBLE.